June 13, 1944. E. D. GEORGE ET AL 2,351,200
RUBBER VALVE HANDLING APPARATUS
Original Filed March 4, 1938 4 Sheets-Sheet 2

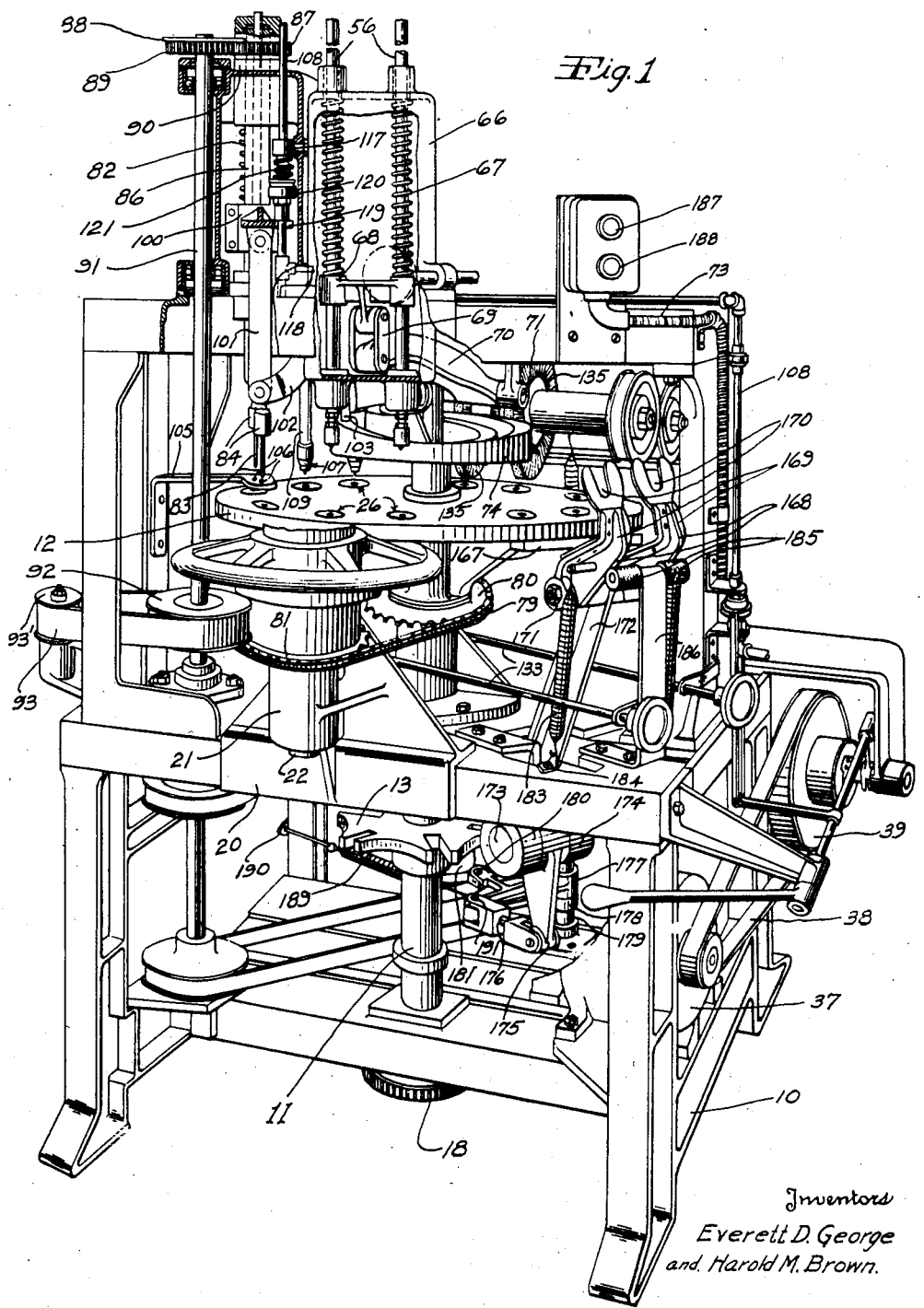

Inventors
Everett D. George and
Harold M. Brown

By
Attorney

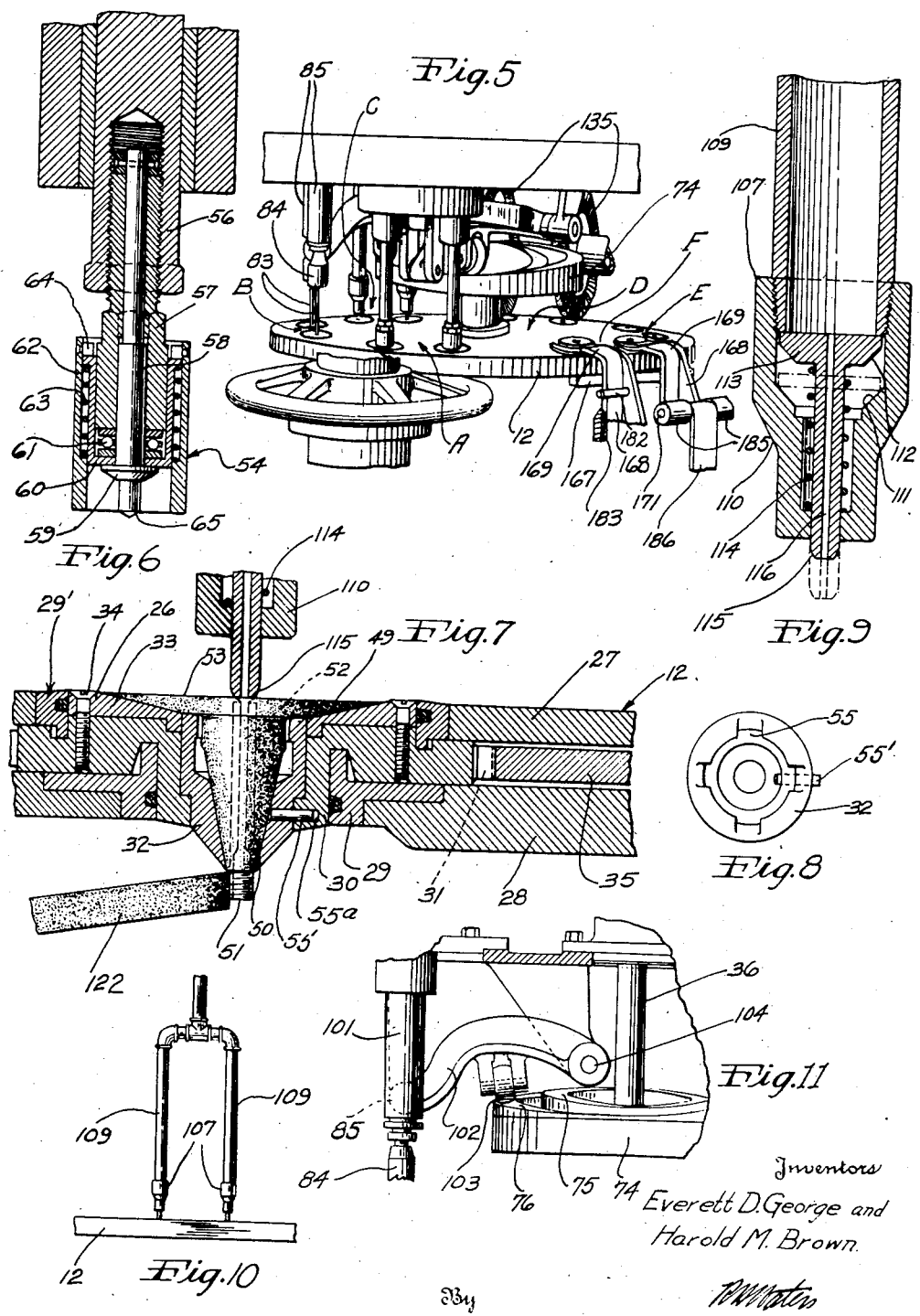

Patented June 13, 1944

2,351,200

UNITED STATES PATENT OFFICE 2,351,200

RUBBER VALVE HANDLING APPARATUS

Everett D. George, Ridley Park, Pa., and Harold M. Brown, Cuyahoga Falls, Ohio, assignors to Wingfoot Corporation, Wilmington, Del., a corporation of Delaware Original application March 4, 1938, Serial No. 193,938, now Patent No. 2,269,658, dated January 13, 1942. Divided and this application September 18, 1941, Serial No. 411,338

7 Claims. (Cl. 198—209)

The present invention relates to a machine for cleaning and buffing tire valves and the like preparatory to applying same to inner tubes and the like. Usually after the valves have been formed the bases thereof have a glazed surface which is not suitable for proper adhesion of the valve to an inner tube and it is customary to buff these bases in order to create a surface which will be of the character such as to provide proper adhesion of the valve to the inner tube. Also the valves after they have been molded may contain and usually do contain some rubber in the hollow metal stem thereof, due to the flow of rubber during the curing process. Also some of the rubber penetrates in and around the threads of the valve and this rubber, together with the rubber within the metal portion, must be removed. It has been generally customary to do this by manual labor and the present invention has for its object the provision of an improved method and means for preparing the valve for application to a tube.

An important object of this invention is to provide means whereby the valves can be quickly placed in position for buffing, cleaning and drilling without danger to the operator.

Another object of this invention is to provide means whereby valves are fed to the machine by a feeding disc or the like and removed from said conveyor device onto a carrier which conveys the valves to and past designated buffing, cleaning and drilling stations, as will be more fully described hereinafter.

Another object of this invention is to provide means for removing the valves from the carrier after they have been buffed and cleaned.

A still further object of this invention is to provide means whereby the valves are automatically removed from the carrier after they have been moved along a given path by the carrier to a designated point.

Still other objects of this invention will appear hereinafter as the description thereof proceeds, the novel features, arrangements and combinations being clearly set forth in the specification and the claims thereunto appended.

This application is a division of our parent application, Serial No. 193,938, filed March 4, 1938, issued as Patent No. 2,269,658, January 13, 1942 and entitled "Valve buffing and polishing machine."

In the drawings:

Fig. 1 is a perspective view of a machine embodying the invention;

Fig. 5 is a fragmentary perspective view illustrating some of the steps in the process of buffing and cleaning the valve;

Fig. 6 is a detailed vertical section through the device for ejecting the valves from the feeding disc into the carrier;

Fig. 7 is a vertical cross-section through one of the valve holders on the carrier and the means for driving same;

Fig. 8 is a plan view of the valve holder illustrated in Fig. 7;

Fig. 9 is a vertical cross-section through the air-blast cleaning device;

Fig. 10 is an elevational view of the two air-blast cleaning devices used; and

Fig. 11 shows a detail of the drill-actuating means.

Figures 2, 3:
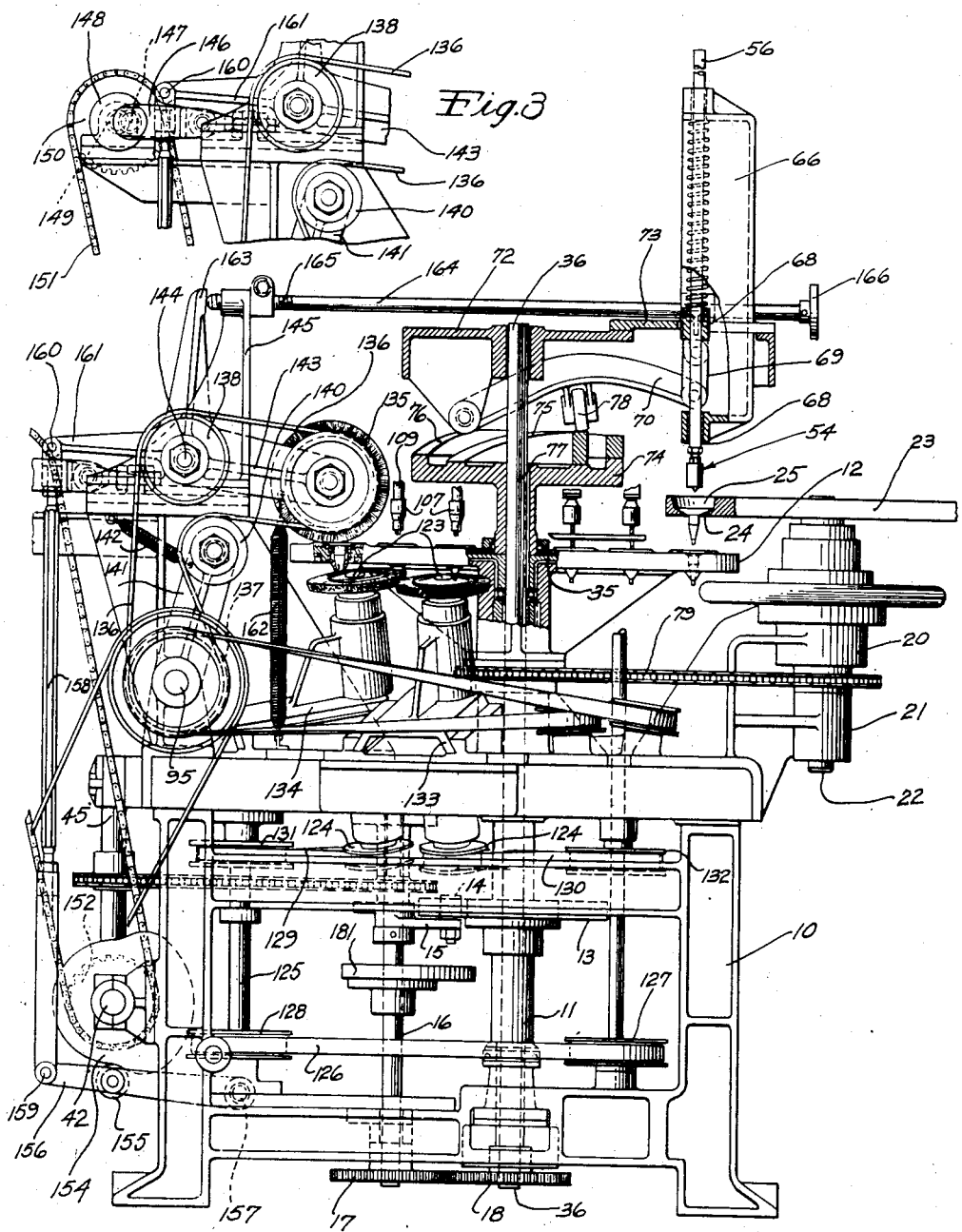
Fig. 2 is a side elevation partly in section of a portion of the machine looking from the left in Fig. 1.
Fig. 3 is a fragmentary side elevation showing a portion of the driving mechanism which is arranged at the left of the machine as viewed in Fig. 2.

The machine comprises a frame 10 on which the various elements thereof are mounted. A vertical hollow shaft 11 extends from the base of the machine upwardly to a point near the top thereof and this supports a valve carrier 12 which is intermittently indexed by any suitable means. In the present instance this indexing is accomplished by the means of a Geneva wheel 13 fixed to the shaft 11 and an actuating pin 14 (see Figs. 2 and 4, particularly) mounted on the end of an arm 15 carried by a rotating shaft 16 which is driven at a uniform speed in the manner hereinafter set forth. The Geneva movement indexes the carrier to six different positions, whereby to bring the valves to six different operating stations spaced equally about the axis of the shaft 11 and at each of the stations a given operation is performed on the valves, and the valves then moved to the next station.

These stations which are more clearly illustrated in Fig. 5 and the operations occurring at those stations are as follows:

Station:
- A—Insertion of the valves into the carrier from the feeding disc.
- B—Drilling out the interior of the metal valves to remove the rubber therefrom.
- C—Blowing foreign matter from the interior of the valves after the same have been drilled, and buffing the external threads on the valves to remove any rubber therefrom.
- D—Buffing the bases of the valves.
- E—Camming device moves valves vertically and ejector removes valves from machine.

Figure 4:
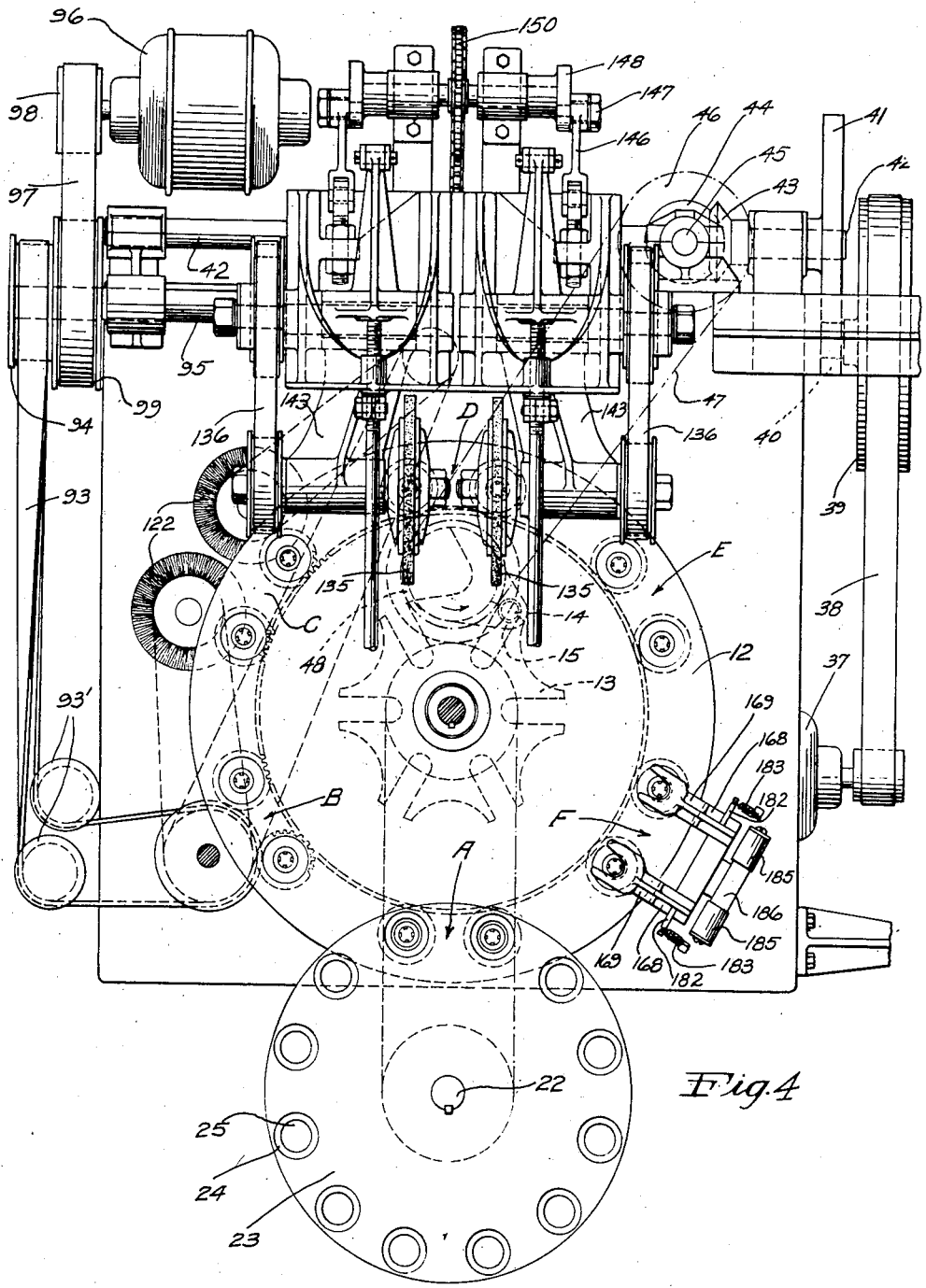
Fig. 4 is a top plan view of the machine illustrated in Figs. 1 and 2 with parts removed for the sake of clearness.

Mounted on the front side of the machine is a bracket 20 having a bearing 21 supporting the rotating shaft 22, the upper side of which, as illustrated in Fig. 4, carries a feeding disc 23 having a series of valve-supporting seats 24 on which the valves are placed with their stems extending downwardly through openings 25. The openings 25 which are surrounded by the seats 24 are made sufficiently large so that the valve stem fits freely therein with only the very outer edges of the valve supported by the valve seats 24. This makes it easy to push the valves through the openings 25 when it is desired to eject the valves into the carrier, since the valves are constructed with thin peripheral edges which yield inwardly when pressure is applied at the centers of the valves to force them through the openings 25.

The carrier is provided with rotating valve supports 26 best illustrated in Fig. 7. It is constructed with an upper plate 27 and a lower plate 28, both of which are rigidly connected together at their peripheries in spaced relation to each other. The bearings 29 and 29', of which there are twelve each, are seated in the lower plate 28 and upper plate 27, respectively, and each of these carries a rotating member 30 which is formed with gear teeth 31 on its periphery. The valve stem is seated within a bushing 32 having an interior tapered opening of substantially the same taper as the valve stem, and the base of the valve extends over and rests on a seat in the disc 33 secured by screws 34 to the member 30. By changing the size and shape of the seats in the bushing 32 and/or annular member 33, valves of different sizes and shapes can be accommodated in the valve supports and can be buffed and cleaned while seated therein without change of any more of the aforesaid parts, and perhaps an adjustment of the amount of travel of the buffing devices or their position with respect to the valve during its movement by the carrier.

Notches 55 are formed in the stem-receiving portion of the bushing 32 to avoid any air pressure building up around the stem sufficient to prevent the valve from being properly seated. These notches also form gripping edges to prevent the valve from turning when the valve is forced into the holder. A pin 55' operating in a bayonet slot 55a holds the sleeve 32 in fixed position with respect to sleeve 30, but permits ready separation therefrom.

The sleeves 30 are driven by means of a gear 35 which is mounted rigidly on a shaft 36 which extends through the hollow shaft 11 which carries the Geneva gear 13.

The constant speed of shaft 36 is derived from the main power drive (see Fig. 4), which is the motor 37, through the intermediary of the belt 38, pulley 39, spur gears 40 and 41, shaft 42, bevel gears 43 and 44, shaft 45, sprocket 46, chain 47, sprocket 48, shaft 16 and gears 17 and 18 (see Fig. 2).

As the carrier 12 is indexed from station to station, the various aforesaid operations are performed on the valve to clean up the valve and place it in condition for application to a tube. A typical valve is shown in Fig. 7 and comprises a flanged rubber base portion 49 with a contiguous rubber stem portion 50 embracing the metal stem 51. A cap is placed on the threaded end of this stem in a well-known manner and, since in the molding operation some rubber is apt to flow into the threads, such rubber must be removed therefrom in order that the cap may be threaded onto the stem. Also, some rubber gets into the bore 52 of the stem and this must be drilled out and, after the drilling, air under pressure is forced through the stem to clean out the rubber particles therein. The flat surface 53 on the base which is to be applied to the inner tube is somewhat glazed when it comes from the mold and it is necessary to condition this surface in order that the valve may be properly applied to the tube. In order to prepare this surface, it is buffed by a suitable wire brush or the like.

The first operation takes place at station A where the valves are removed from the feeding disc 23 into the carrier 12. This operation is best illustrated in Figs. 1, 2 and 6. As a pair of valves are brought into alined position over a pair of the valve supports 26 they are forced out of the openings in the feeding disc 23 into the valve supports 26 by a pair of plungers indicated generally at 54. The general purpose of these plungers is to engage the bases of the valve and push the valves through the restricted openings 25 of the feeding disc 23 and to press the valves firmly into their seat in the carrier 12 so that they occupy positions such as shown in Fig. 7. Since each valve rests loosely within its openings in the disc 23, it is necessary that the plunger be so constructed as to move the valve without permitting the same to tilt, as, otherwise, the stem may not enter the opening at the center of the support 26. For this purpose the plunger is designed as illustrated most clearly in Fig. 6. The head is carried by a reciprocable shaft 56 into which is screw-threaded a hollow sleeve 57. Within this head is a pin 58 having an enlarged head 59 which holds the cup-shaped sleeve 60 over the lower end of the sleeve 57 and retains the anti-friction bearing 61 in position between the sleeves 57 and 60. A third sleeve 62 embraces the sleeves 60 and a spring 63 normally holds the sleeve 62 projected downwardly as illustrated in Fig. 6, but permits the same to be moved upwardly when pressure is exerted on the lower end thereof. Stops 64 on the sleeve 62 prevent separation of the sleeves 60 and 62. The pin 58 has a reduced extension 65 projecting from the lower end thereof and as the plunger descends the conical end on the extension 65 enters the hole at the center of the stem and the sleeve 62 engages the base to prevent the tipping of the valve. Further downward movement of the shaft 56 causes the spring 63 to be compressed and the pin 65 to enter the stem opening to a greater extent. This holds the valve against lateral shifting. The result is that as the valve is forced from the feeding disc 23 into the opening in the valve support 26, the valve is firmly held against tipping movement and is properly received in the valve support by the plunger. The yieldingly mounted sleeve 62 also assists in firmly pressing the valve into the operative position shown in Fig. 7 so that all of the parts of the valve are in proper position to be operated upon.

In order to secure the aforesaid movement of the plungers 54, the shafts 56 which carry the plungers are slidably mounted for vertical movement in the bracket 66 and are spring-pressed in a downward direction by means of springs 67 abutting against the bracket 68 which embraces and is secured to both of the shafts 56, as is most clearly illustrated in Figs. 1 and 2. To this bracket 68 is pivoted a link 69 which, in turn, is pivotally connected to the arm 70 pivoted at 71 to the bracket 72 secured rigidly to the cross-member 73 of the frame 10 or made integral therewith. This bracket also forms an upper bearing for the rotating shaft 36.

A cam 74 has an inner cam track 75 and an outer cam track 76. This cam is keyed as at 77 to the continuously rotating shaft 36 and partakes of the movement thereof. A roller 78 mounted on the under side of the arm 70 engages the cam track 75 and is raised and lowered once each time the cam makes a complete revolution. The cam rotates one complete revolution for each complete indexing movement so that each time the feeding disc and carrier are indexed the shafts 56 are moved downwardly to move the valves from the feeding disc into valve holders on the carrier, and then upwardly to return the plungers 54 to their inoperative positions shown in Fig. 2.

The feeding disc 23 is indexed at the same time that the carrier is indexed by means of a chain 79 or its equivalent trained over sprocket 80 on the upper end of the hollow sleeve 11, which is indexed by means of the Geneva movement 14—13 and the sprocket 81 secured rigidly to the shaft 22 on which the carrier 23 is rigidly secured. This insures simultaneous indexing of the feeding disc 23 and the carrier 12.

At the next station, station B (see Figs. 1, 5 and 11) the valves are drilled, that is any rubber within the bores of the stems is drilled out of the same by means of the bits 83 mounted in chucks 84 secured to the ends of the spindles 85, which are mounted for rotation. There are two similar spindles as indicated in Figs. 1 and 5 and each is similarly mounted in parallel sleeves 86 for vertical reciprocating movement.

Splined to the top of each spindle 85 is a gear 87 and these gears mesh with a driving gear 88 which has a projecting flange 89 to prevent the gears 87 from being raised vertically, the downward movement of the gears 87 being prevented by the bosses 90 on the bracket which supports the spindles. The gears, as has heretofore been stated, are splined to the spindles 85 so that the spindles may move vertically in the gears while the driving relation between the gears and the spindle is maintained.

The driving gear 88 is secured to a shaft 91 which also has a pulley 92 secured thereto and which is driven by means of a belt 93 running over idle pulleys 93' and trained over a pulley 94 on the shaft 95, which shaft in turn is driven from a motor 96 by means of a belt 97 trained over the pulleys 98 and 99 on the motor 96 and shaft 42 respectively. Thus, it will be seen that the drills 83 are driven at a continuous rate by means of the motor 96 and are capable of vertical reciprocating motion.

The vertical reciprocating motion of the drills is accomplished through the following mechanism. A bracket 100 secured to the non-rotatable but vertically reciprocable sleeves 86, which embrace the rotating spindles 85, is adapted to reciprocate with the spindles 85 and this bracket is pivotally connected, as by a link 101, to the end of an arm 102, which in turn is pivoted to the frame of the machine at 104 (see Fig. 11) and is reciprocated by means of a roller 103 on the arm 102 which rides on the outer cam track 76. Springs 82 normally urge the spindles downwardly and hold the roller 103 on the cam track 76. As the cam 74 rotates, the spindles are given a vertical reciprocating motion of such a nature as to bring the drills 83 downwardly into the stems of the valves after they arrive in position beneath the drills and to thereafter withdraw the drills into position shown in Fig. 1. Since the drills are relatively small in cross-section, a bracket 105 secured to the frame is provided with openings 106 to strip the valves from the drills if they should be retracted therewith after being drilled, and also sweep any valves off the carrier which may happen to lie on the surface thereof. These drills remove the rubber from the metal valve stems.

Any particles of rubber remaining in the stems must be cleaned out and for this purpose the valves are indexed into the next position at C where an air blast is employed to clean out the valve stems, at which station the outer cap-receiving threaded end of the stem is buffed to remove any rubber which may have flowed over the threads during the molding operation.

As is seen most clearly in Figs. 1 and 2, 9 and 10, there is provided a pair of devices 107 used for blowing air through the valve stem to clean the foreign matter therefrom after the stems have been drilled. One of these devices is best illustrated in Fig. 9 and a description of the one will suffice for both. The devices 107 are connected to a common supply pipe 108 (see Fig. 10) and these devices comprise pipes 109, which, at their lower ends, have sleeves 110 threaded therein, the sleeves being reduced at their lower ends and having an inner tapered seat 111, against which a similarly tapered seat 112 on a valve 113 is adapted to seat when in its lower or dotted-line position shown in Fig. 9. The valve 113 is normally held upwardly against the end of the pipe 109 by a spring 114 and when air is introduced into the pipe 109 the valve is forced downwardly and the lower, outer end 115 thereof seats against the rubber at the base of the valve stem, as is clearly illustrated in Fig. 7. In this position the seats 112 and 110 are in engagement with each other and prevent the escape of air around the valve, the air passing through the narrow passage 116 in the valve stem at a high velocity to blow the air out of the valve stem. On release of the air pressure, the valve again assumes the position shown by full lines in Fig. 9. Due to the engagement of the lower end 115 with the valve being treated, the valve is kept from jumping off its seat.

In order to introduce air into the pipes 109, there is a valve 117 (see Fig. 1) which is used to control the flow of fluid through the conduit 108. In Fig. 1 the air is supplied from any suitable source through a conduit 118 leading into the conduit 108 and there are fingers 119 on the bracket 100 which are adapted to engage the lower end of the sliding sleeve 120 forming a part of the valve 117. A spring 121 normally holds the sleeve 120 in its lowermost position but when the bracket 100 is moved upwardly the spring is compressed and the sleeve 120 is moved to the position in which it cuts off the supply of air to the conduit 108. When the bracket 100 descends with the spindles 84, the sleeve 120 is forced downwardly by the spring 121 and air flows through the conduit 108 to the pipes 109. Any appropriate kind of valve can be used for that illustrated at 117, whereby the flow of fluid is controlled through the conduit 108.

While the air is being blown through the valve stem, the valve stem is also being buffed at its lower, externally threaded end by means of a buffer, such as a wire brush 122, which rotates with its periphery against the threads on the stem to clean any rubber or foreign material therefrom. These brushes most clearly illustrated in Fig. 2 are carried on spindles 123, to the lower ends of which are attached the pulleys 124 actuated in the following manner. A rotatable shaft 125 arranged parallel to the driving shaft 91 is connected thereto by a belt 126 trained over the pulleys 127 and 128 on the shafts 91 and 125 respectively. Belts 129 and 130 are trained over the pulleys 131 and 132 on the shafts 125 and 91 respectively and over the pulleys 124 to actuate the spindles 123 and, consequently, the wire brushes 122. These wire brushes may be mounted for sliding movement, as by means of slides 133 and 134 provided for each of the two brushes. This is necessary for the purpose of compensating for wear. Normally these brushes are arranged with their outer peripheries substantially tangential to the outer portions of the valves to be buffed, as is more clearly illustrated in Fig. 4, whereby as the valves rotate into the position C the same are brought into engagement with the brushes and are buffed thereby. The slides can be adjusted from the front of the machine by turning the handwheels 134' (see Fig. 1) on the rods 133'.

The valves are next advanced to the position D where the bases of the valves are buffed to clean the same and remove the glazed surface therefrom. This is accomplished by the use of wire brushes, such as 135, mounted to rotate about a horizontal axis and these are driven by belts 136 from the pulleys 137 on the shaft 95, the belts being trained over the idle pulleys 138 and 140. The idle pulley 140 is mounted on an arm 141 pivoted on the shaft 95 and urged toward the belt by a spring 142 to maintain the belt under sufficient tension to drive the wire brush. The brushes are mounted on the ends of arms 143 which are rockable on shafts 144, which shafts in turn are mounted on sliding brackets 145, whereby the brushes 135 may be rocked about the shafts 144 as pivots and also moved to the right and left (as viewed in Fig. 2) so as to move over the base of the valve to buff the entire surface thereof.

The motion of the brush in going over the surface of the valve is quite important and it has been found that the best results are obtained by first bringing the brushes down into engagement with the valve substantially at the center of the base thereof; then moving the brushes outwardly toward the periphery of the base or to the left as viewed in Fig. 2; then upwardly out of contact with the valves and then inwardly or to the right in Fig. 2 to bring the brushes into position above the centers of the next valves to be buffed, the brushes then being lowered into engagement with the brushes and the cycle repeated.

The motions of the brushes are produced by cams and eccentrics in the following manner. In order to give a reciprocating motion to the sliding brackets 145 (from right to left and left to right in Fig. 2) there is connected to the rear end of each of the carriages a link 146 (see Fig. 3) which is pivoted at one end thereto, and has the other end thereof mounted on an eccentric pin 147 carried by the rotating disc 148 mounted on the shaft 149, which also has a sprocket 150 (see Figs. 2 and 4) over which is trained a chain 151 driven from a similar sprocket 152 on the shaft 42 and is driven thereby. Thus, it will be seen that, due to the eccentricity of the pin 147, the carriage will be given a reciprocating motion.

The brushes are rocked about their pivots 144 to impart vertical movement thereto by means of a cam 154 operating against a roller 155 on an arm 156 pivoted at 157 to the frame 10 and this arm in turn is connected to a link 158 by the pivot 159 and the link in turn is pivoted at 160 to an arm 161 rigid with the arm 143. This cam, when operating against the roller 155, causes a vertical reciprocation of the link 158 and a similar but opposite reciprocation to the brush 135. The buffing wheels or brushes are normally urged in a downward direction by springs 162 and the downward movement is limited by means of a rigid arm 163 rigidly connected to the arms 143 and 161. This stop is adapted to engage the end of a rod 164 threaded at 165 into the upper end of the bracket 145. By adjusting the position of the rod by rotating the hand wheel 166 at the end thereof, the amount of contact which the brushes have with the work may be readily adjusted and while the machine is in motion. The hand wheels 166 are arranged close to the operator's position at the front of the machine so that if the bases are not being properly buffed the brushes may be adjusted to bring them into proper contact with the bases for securing the proper action thereon. The valves which are now completely buffed and cleaned are ready to be removed from the machine and this is done at the station F.

At the station E no action takes place as far as the valves are concerned, but as the valves advance from the station E to the station F their stems engage an inclined guide 167 located beneath the carrier 12 (see Figs. 1 and 5) and this causes the valve bases to be raised above the upper surface of the carrier 12 so that suitable devices may be inserted beneath the bases to lift them completely out of the valve holders.

The means provided for this purpose comprise a pair of arms 168 having the upper surfaces offset at 169 and forked to provide the valve-stem receiving openings 170. The arms 168 are pivoted at 171 (see Fig. 1) to the upper end of a generally vertically extending arm 172, which in turn is pivoted at 173 to a bracket 174 on the base. This arm has an extension 175 at the lower end thereof connected by a link 176 to an arm 177 pivoted at 178 to a shaft 179 and this arm (see particularly Fig. 1) has a roller 180 thereon engaging a cam 181 on shaft 16 which is also shown in Fig. 2. This causes a rocking movement of the arm 172 to and from the edge of the carrier 12. A spring 189 connected to the frame 190 and to the arm 177 at 191 holds the roller 180 against the cam 181. The arms 168 have pins 182 extending laterally therefrom and connected to springs 183 fastened to brackets 184 on the base of the machine. Assuming that the parts are in the positions illustrated in Fig. 1, the arm 172 has not completed its full movement to the right and as that movement continues the arms 168, which are in engagement with the rubber abutments 185 mounted on the bracket 186, are caused to rotate in a counterclockwise direction about the pivot 171 and this continues until the springs pass the center of the pivot 171, whereupon the springs cause a snap action of the arms in a counter-clockwise direction to bring the offset portions thereof into a substantially horizontal position so that as the arm 172 moves to the left or counter-clockwise the ends of the offset portion become arranged beneath the bases of the valve as illustrated in Figs. 4 and 5. As the arm 172 continues its movement to the left, or counter-clockwise, as viewed in Fig. 5, the arms 168 engage the edge of the carrier 12 and the springs are then moved to the other side of the pivot 171, which causes a snap action of the arms to the right or clockwise, with a consequent lifting of the valves from their supports and the throwing of these valves into any suitable receptacle arranged by the machine. In the present instance a funnel-shaped receptacle was arranged in the path of movement of the valves to receive the same and direct them into a suitable receptacle. Instead of having the arms engage the edge of the carrier, a pair of stops similar to 185 may be arranged adjacent the edge of the table for stopping the movement of the arms 168 to the left to cause the aforesaid snap action in a clockwise direction.

Any suitable means may be employed for controlling the action of the various parts and there is indicated suitable control buttons, such as 187 and 188, for starting and stopping the machine. These start the motors which are used in this embodiment to drive the machine.

From the description, it will be seen that the valves are inserted by hand in a feeding disc 23 and are then removed therefrom and inserted in the valve supports 26 by means of the plungers 54. The carrier is then indexed to bring these valves successively into the following positions; the position B where the valves are drilled by the drills 83; the position C where the air is blown through the valve stems and the outer threaded portions of the valves are buffed by the brushes 122; the position D where the bases of the valves are buffed by the brushes 135 and, finally, to the position F where the valves are removed from the valve holders 26 and thrown into a suitable receptacle.

It will be understood that various means may be used for accomplishing the results herein described and the drawings merely illustrate one embodiment of our invention. Obviously, the various arrangements and combinations can be varied by those skilled in the art to which the invention pertains and therefore we do not wish to be limited in our invention except as may hereinafter be set forth in the appended claims.

We claim:

1. A valve-treating machine having a rotary carrier with valve supports including a bore to receive the stem thereof, and a recessed portion aligned with said bore for receiving the base of the valve, means for engaging the stems of the valves for moving the bases thereof out of their recesses, and means movable radially of the carrier and into a position between the carrier and the base of the valve for ejecting a valve from the carrier.

2. A valve-treating machine having a rotatable carrier with valve supports each including a bore to receive the stem thereof, and a recessed portion aligned with said bore for receiving the base of the valve, means for engaging the stems of the valves for moving the bases thereof out of their recesses, and means movable radially of the carrier into a position between the carrier and the bases of the valves for ejecting a valve from the carrier, comprising a rockable arm having projections thereon adapted to engage the base and lift it from its seat, and means for actuating said rockable arm to rock the same quickly about its pivot to lift the valves from their positions on said carrier and forcibly throw the same clear of the carrier.

3. Means for ejecting valves from an intermittently driven valve carrier in which the valves are supported in an inverted position by their base portions resting on the upper side of the carrier, comprising means for lifting the valves upward partially off the carrier to provide a space between the carrier and the bases of the valves, a movable arm carrying spaced projections mounted to and for movement to and from the valve position to bring the projections into position between the carrier and bases of the valves, and means operative with the carrier at rest to cause the projections to lift the valves upward from the carrier and remove the same therefrom.

4. Means for ejecting valves from a valve carrier in which the valves are supported in an inverted position by their base portions, comprising means for lifting the valves partially off the carrier to provide a space between the carrier and the base of the valves, a movable arm carrying spaced projections mounted for movement to and from the valve position to bring the projections into position between the carrier and bases of the valves and to thereafter cause the projections to lift the valves from the carrier and remove the same therefrom, said movable arm being mounted on a pivot and carried by movable support in a direction to and from the carrier, means for engaging the arm to move said arm about its pivot as said support is moved, and yielding means for quickly swinging said arm about its pivot after a predetermined movement of said arm about its pivot, whereby said arm quickly lifts the valves from the carrier and forcibly throws the valves away therefrom.

5. Rubber valve handling apparatus comprising an intermittently rotatable carrier, a plurality of valve holding means on the carrier and spaced circularly about the axis of rotation thereof, means for periodically indexing the carrier in its intermittent rotation, means for loosening each valve in its holding means in turn and during the movement of the carrier whereby to space the valve bases successively from the carrier, and means movable radially between the carrier and the base of the valve for removing each valve from its holding means in turn and when the carrier is at rest.

6. A valve-treating machine having a carrier with valve supports each including a bore to receive the stem thereof, and a recessed portion aligned with said bore for receiving the base of the valve, and means movable into a position between the carrier and the bases of the valves for ejecting a valve from the carrier, comprising a rockable arm having projections thereon adapted to engage the base and lift it from its seat, and means for actuating said rockable arm with the carrier at rest to rock the same quickly about its pivot to lift the valves from their positions on said carrier and forcibly throw the same clear of the carrier.

7. Means for ejecting valves from a valve carrier in which the valves are supported in an inverted position by their base portions, comprising a movable arm carrying spaced projections mounted for movement to and from the valve position to bring the projections into position between the carrier and bases of the valves and to thereafter cause the projections to lift the valves from the carrier and remove the same therefrom, said movable arm being mounted on a pivot and carried by movable support in a direction to and from the carrier, means for engaging the arm to move said arm about its pivot as said support is moved, and yielding means for quickly swinging said arm about its pivot after a predetermined movement of said arm about its pivot, whereby said arm quickly lifts the valves from the carrier and forcibly throws the valves away therefrom.

EVERETT D. GEORGE
HAROLD M. BROWN.